Feb. 6, 1968     G. L. ANDERSON     3,367,684
PRESSURE FITTING FOR A TUBE JOINT
Filed Aug. 12, 1966
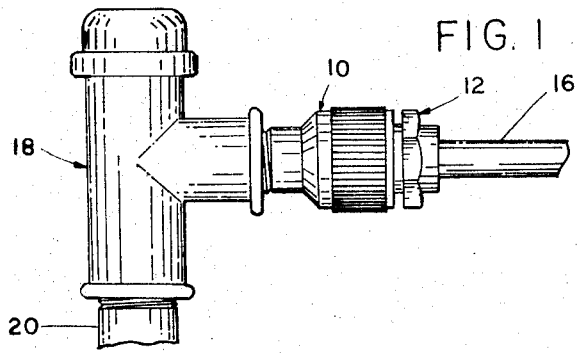
FIG. 1
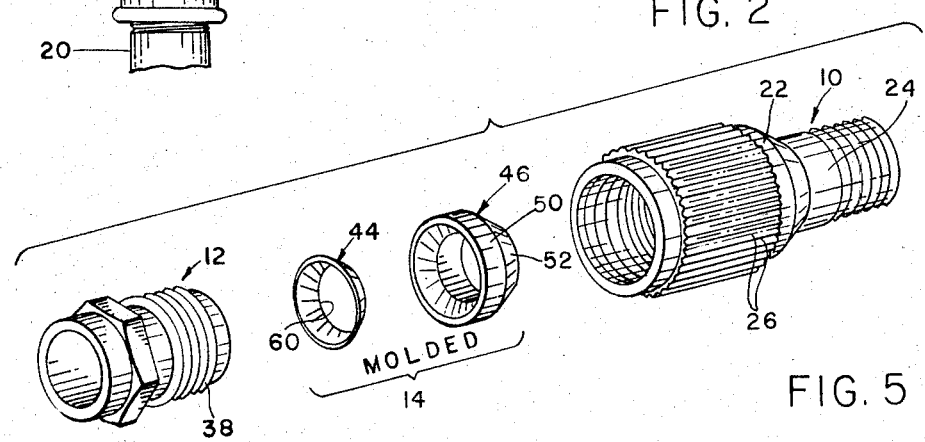
FIG. 2
FIG. 5
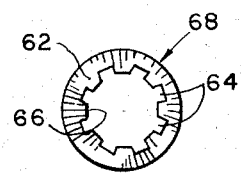
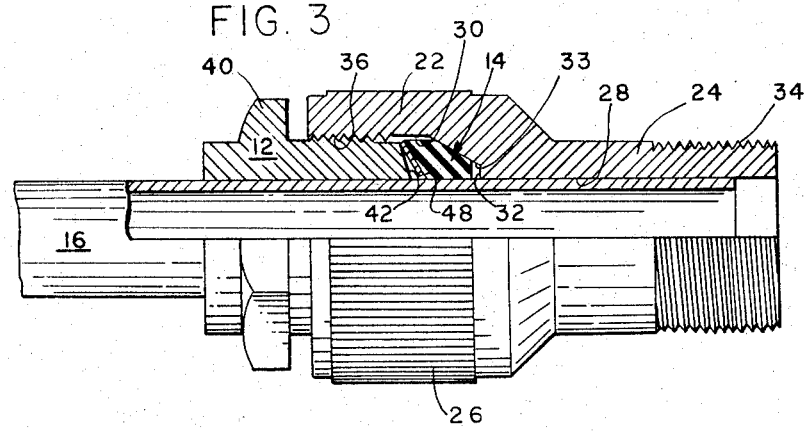
FIG. 3
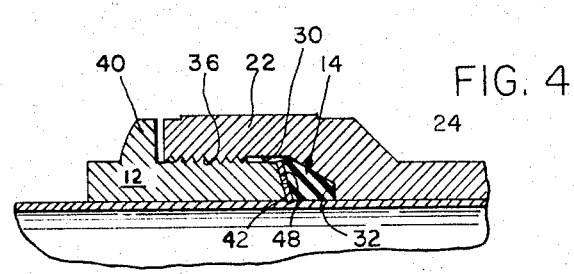
FIG. 4
INVENTOR
GERALD L. ANDERSON
BY Norman Gerlach
ATT'Y 3,367,684
PRESSURE FITTING FOR A TUBE JOINT
Gerald L. Anderson, Bradford, Pa., assignor to Eclipse Fuel Engineering Co., Rockford, Ill., a corporation of Illinois
Continuation-in-part of application Ser. No. 439,638, Mar. 15, 1965. This application Aug. 12, 1966, Ser. No. 579,445
1 Claim. (Cl. 285—340)

ABSTRACT OF THE DISCLOSURE

This application is a continuation-in-part of my patent application Ser. No. 439,638, filed on Mar. 15, 1965, now abandoned and entitled "Pressure Fitting for A Tube Joint."

The present invention relates generally to pressure fittings for tube joints and has particular reference to a new and improved fitting which is capable of establishing a leak-proof tube-to-pipe joint without danger of the tube pulling out when tensional stresses are applied thereto and, in addtion, is of a releasable nature so that the tube may be readily withdrawn from the fitting when desired.

In recent years, public utility companies, particularly those which supply gas service, have found it increasingly expedient to employ flexible tubing for a lead-in connection from the ground-embedded gas main to the gas distribution pipe within a building. This has given rise to a class of fittings whereby such flexible tubing may be connected at one end to the gas main and at its other end to the distribution pipe without necessitating threading or flaring of the tubing. It is to this particular class of fittings that the present invention specifically relates. A fitting which is constructed according to the present invention is not, however, limited to use in connection with a gas lead-in connection of the aforementioned character, and such fitting may, if desired, and without modification, be employed as a tube-to-pipe fitting in a wide variety of hydraulic or pneumatic installations regardless of whether such installations are high or low pressure ones.

The salient feature of the present invention resides in the provision of a novel means for locking the tube with respect to the body of the fitting so that there will be no possibility of tube pull-out. This feature is attained by employing a novel releasable locking ring and gasket assembly which surrounds the body-enclosed portion of the tube and is adapted to be compressed axially by means of a nut when the nut and the fitting body are tightened. The gasket portion of the assembly is adapted, upon axial compression thereof, to seize the tube in the usual manner of tube seizure, while the locking ring portion of the assembly is of frusto-conical design and is adapted to become constricted or flattened upon the adjacent portion of the tube.

It it well known that a frusto-conical ring of comparatively steep slant angle will, upon flattening out, decrease its inside diameter and such a decrease in diameter has long been employed in connection with a tube-to-pipe fitting of the character under consideration in order to effect seizure or gripping of the adjacent portion of the tube. Locking rings of the type under consideration and as herein contemplated are generally referred to as Belleville springs. Such rings or springs are formed of spring steel material and if they are not flattened beyond a predetermined yield point, they will return to their original frusto-conical condition. However, such rings or springs, when nearly or completely flattened, will exceed the elastic limit of the spring steel and become set so that they will permanently assume a substantially planar condition.

According to the present invention, the improved tube-to-pipe fitting employs such a frusto-conical locking ring or spring in combination with a compressible gasket to which the ring is preferably but not necessarily permanently bonded. The gasket exerts a reaction backing effect upon the ring and axial thrust is applied to the ring by means of the fitting nut which, when tightened with respect to the body of the fitting, exerts its influence against the outer periphery of the ring. The gasket prevents free axial slippage of the ring along the tube which it surrounds and thus causes the ring to commence its flattening and tube-gripping effect as soon as tightening of the nut is commenced. As the nut-tightening operation continues, the gasket is compressed while at the same time the inside diameter of the ring shrinks upon the tube, thus attaining the desired tube-locking function.

In order to prevent complete flattening of the locking ring and consequent exceeding of the elastic limit of the latter as previously described, the adjacent or inner end face of the nut is of frusto-conical configuration, the slant angle involved being slightly greater than the slant angle of the locking ring in its original or feed condition. Thus, regardless of the amount of torque which is applied to the nut for tightening purposes, the locking ring is never forced to its flat condition, nor is the elastic limit thereof exceeded with the result that when tightening pressure is relieved, the ring will return to its original condition and the tube will be released for ready or expeditious removal.

The provision of a tube-to-pipe fitting embodying the above-outlined tube-releasing feature constituting the principal object of the invention, numerous other objects and advantages of the invention of an ancillary nature are inherent in the present tube-to-pipe fitting. Among these are the provision of a fitting which is comprised of a minimum number of parts, specifically three parts and, therefore, may be manufactured at a low cost; one in which the sealing gasket is completely contained so as to prevent extrusion thereof from the fitting when the parts are tightened; one which engages the tube along an appreciable axial extent so that flexing of the tube may be resorted to without damaging the fitting or impairing the sealing properties thereof; and one which may be manufactured and assembled as a package-type unit, ready for application to a pipe section without dismantlement of the fitting and also ready for reception therein of the tube section by a stab operation, the only manual operation required being to tighten the nut when the fitting has thus been applied to the pipe and tube sections.

Other objects and advantages of the invention, not at this time enumerated, will readily suggest themselves as the following description ensues.

In the accompanying single sheet of drawings forming a part of this specification, two illustrative embodiments of the invention are shown.

In these drawings:

FIG. 1 is a fragmentary side elevational view of a tube-to-pipe fitting embodying the principles of the present invention and showing the same operatively applied to a pipe section and a tube section;

FIG. 2 is an exploded perspective view of the improved fitting;

FIG. 3 is a view partly in section and partly in side elevation taken longitudinally through the fitting of FIG. 1;

FIG. 4 is a fragmentary quarter section showing the fitting parts tightened upon a section of a tube; and FIG. 5 is an end view of a modified or alternative form of locking ring which is capable of being employed in connection with the present invention.

Referring now to the drawings in detail, the tube-to-pipe fitting of the present invention consists of three parts, namely, a fitting body 10, a nut 12, and a two-part unitary or inseparable locking ring and gasket assembly 14. The three parts, when assembled upon one another, constitute a package-type fitting in the form of a socket assembly into one end of which the unthreaded and unflared end of a flexible tube, such, for example, as the tube section 16 is adapted to be projected by a stab operation as will be described subsequently.

The fitting body 10 is preferably in the form of a casting. It is designed for attachment to a pipe or pipe fitting such as the T fitting 18 which may be associated with a gas distribution pipe 20. When the fitting is so attached and the tube section 16 projected into the fitting and the fitting parts tightened, there is established a sealed leak-proof connection which will not pull apart. As best seen in FIG. 3, the fitting body 10 is in the form of an elongated generally cylindrical sleeve having an enlarged socket portion 22 at one end thereof and a reduced shank portion 24 at its other end. The outer surface of the socket portion 22 may be knurled or ribbed as indicated at 26 or it may be made hexagonal or octagonal in order readily to receive a wrench or similar turning tool. An axial bore 28 extends through the shank portion of the body 10 of the fitting and communicates at its inner end with an enlarged counterbore 30 in the socket portion 22, the bore and counterbore merging by way of an inner radial shoulder 32 and an outer frusto-conical surface 33. The latter has a slant angle on the order of 30° with respect to the axis of the tube section 16. The reduced shank portion 24 of the body 10 is threaded exteriorly as at 34 for threaded reception in the T fitting 18 or a pipe section (not shown), while the counterbore 30 is provided with a female screw thread 36 for threaded reception of the usual male screw thread on the nut 12 of the fitting.

The nut 12 is likewise generally cylindrical and its male screw thread is designated by the reference numeral 38. An outwardly extending flange 40 of hexagonal configuration is formed on the central portion of the nut in order to permit the nut to be gripped by a wrench or other turning tool in connection with tightening or loosening of the nut with respect to the body 10 of the fitting. An axial bore 41 extends through the nut 12 and is of the same diameter as the bore 28. The forward or inner end face 42 of the nut 12 is of frusto-conical configuration, that is, it is inwardly tapered, and has a slant angle which may be on the order of 80° with respect to the axis of the tube section 16, this end face being designed for cooperation with the locking ring and gasket assembly 14 in a manner that will be made clear presently.

The locking ring and gasket assembly consists of two parts, namely, a flexible resilient locking ring 44 and a compressible elastomeric gasket 46. The two parts, i.e., the ring and gasket, are preferably, but not necessarily, molded together in order to form a unitary one-piece assembly such as is shown in FIGS. 3 and 4, although these parts are shown separated in the exploded illustration of FIG. 2.

The locking ring 44 is preferably formed of spring steel. It is of concavo-convex or frusto-conical configuration and has a slant angle slightly less than the slant angle of the end face 42 of the nut 12. The slant angle of the ring may be on the order of 60° with respect to the axis of the tube section 16 when the ring is not under compression. The inner diameter of the locking ring is a few thousandths of an inch greater than the outer diameter of the tube section 16 when the ring is in its normal or uncompressed condition. The locking ring is seated and may be bonded within a frusto-conical depression or socket 48 (see FIG. 2) in the adjacent end face of the gasket 46, the depression having a slant angle the same as or commensurate with the slant angle of the ring. As shown in FIG. 2, the gasket is provided with a short cylindrical section 50 and a slightly longer frusto-conical section 52, the latter being designed for contact with the frusto-conical surface 33 of the body 10. The over-all diameter of the locking ring 44 and the over-all diameter of the elastomeric gasket 46 are substantially equal so that the locking ring completely covers the frusto-conical surface that defines the socket 48. Thus, there is no excess elastomeric material beyond the outer circular edge of the locking ring 44 and, before the nut 12 is tightened in the enlarged socket portion 22 of the fitting body 10, a clearance exists between the elastomeric material of the gasket 46 and the counterbore 30 of the body as clearly shown in FIG. 3.

The tube-to-pipe fitting of the present invention is adapted to be marketed as an assembled package unit, the locking ring and gasket assembly 14 being positioned within the annulus which is afforded by the counterbore 30, and the nut 12 being partially threaded into the body 10 at least to such extent that the frusto-conical inner end face 42 of the nut lightly engages the adjacent frusto-conical surface or concave side of the locking ring 44. The tube section 16 may be inserted endwise into the fitting so that the three parts 10, 12 and 14 are positioned at any desired point along the tube section. At the particular region where the operator desires to effect the anchorage, the operator need only tighten the nut 12 within the body 10 and the union or joint is then complete. Upon tightening of the nut 12, the locking ring 44 initially is forced against the gasket 46 and the latter is forced axially against the frusto-conical surface 33, thus compressing the gasket. As the nut continues to be tightened, the locking ring 44 finds reaction support against the gasket 46 so that it will not slide axially on the tube section 16 any appreciable distance. As soon as this reaction support becomes appreciable, the tendency is for the ring to flatten out, thus slightly decreasing the inside diameter of the ring to the end that the inner periphery or edge of the ring will engage the tube section 16 and actually bite into the relatively soft metal thereof as illustrated in FIG. 4. When the nut 12 is fully tightened, i.e., when it is torqued to the predetermined recommended degree, the various parts of the fitting assume the positions wherein they are illustrated in FIG. 4 with the frusto-conical inner end face 42 of the nut bearing substantially coextensively against the concave side of the locking ring 44, the ring at this time having flexed to such a degree that its slant angle is the same as the slant angle of the fixed frusto-conical inner end face 42 of the nut 12. At this point, no further flexing of the locking ring 44 is possible since the pressure formerly exerted only in the peripheral region of the locking ring by the inner end face 42 of the nut is now equalized over the entire face of the locking ring and the slant angle assumed by the ring cannot exceed the slant angle of such inner end face. Since, as previously described, this slant angle is slightly greater than the original slant angle of the locking ring, the ring will be flexed toward its flat condition but will not be flexed to such a degree that its elastic limit is exceeded. Thus, upon backing off of the nut 12, the locking ring will return to its original slant angle and the tube 16 will be released from any gripping action on the part of the ring. As long as the nut 16 remains tightened, the gasket 46 will remain compressed within the annulus surrounding the tube section 16 so that effective sealing of the tube section will take place. When the locking ring 44 releases the tube by reason of the release of the axial pressure thereon that is exerted by the nut 12, the gasket 46, which preferably is formed of neoprene or other suitable elastomeric material having physical properties similar to neoprene, will expand axially and assume its original condition wherein it releases the tube section 16.

Whereas in FIGS. 2, 3 and 4, the locking ring 44 is shown as being provided with a truly circular inside periphery or edge 60, it is within the purview of the present invention to employ a locking ring, such as the ring 62 of FIG. 5, wherein the inner marginal portion thereof is formed with a series of inwardly projecting locking teeth 64, the ring being molded or otherwise bonded to a neoprene or other elastomeric gasket 66 substantially identical to the gasket 46, the two thus assembled parts constituting the modified locking ring and gasket assembly 68 of FIG. 5. Such a locking ring and gasket assembly may be substituted for the locking ring and gasket assembly 14 without appreciable change in function or operation.

The invention is not to be limited to the exact arrangement of parts shown in the accompanying drawings or described in this specification as various changes in the details of construction may be resorted to without departing from the spirit or scope of the invention. For example, whereas the slant angle of the frusto-conical inner end face 42 of the nut 12 has been stated to be on the order of 80°, this angle may be varied within appreciable limits. Similarly, whereas the slant angle of the frusto-conical locking ring 44 has been stated to be on the order of 60°, this angle also may be varied within wide limits. It is essential only that these angles be not the same angle and that the slant angle of the frusto-conical end face 42 shall be somewhat steeper or greater than the slant angle of the locking ring to the end that the necessary flexing of the ring may take place during tightening of the nut. It is also within the purview of the present invention to line the interior or bore 41 of the nut 12 and the bore 28 in the body 14 with respective insulating sleeves in order to give insulating properties to the fitting as a whole. Therefore, only insofar as the invention is particularly pointed out in the accompanying claim is the same to be limited.

Having thus described the invention what I claim as new and desire to secure by Letters Patent is:

1. A tube-to-pipe type pressure fitting comprising an elongated one-piece fitting body having an axial bore and at one terminal end thereof an enlarged counterbore which merges with the bore by way of a frusto-conical surface at the juncture region of the bore and counterbore, a tube section having a cylindrical outer surface of uniform diameter, projecting through said counterbore, and extending snugly into said bore, said frusto-conical surface at the juncture region of the bore and counterbore having a slant angle of the order of 30° with respect to the axis of the tube section, said counterbore, in combination with the tube section, defining an annular socket surrounding the tube section, a socket-closing nut having a bore closely surrounding the tube section and provided with a cylindrical section which is threadedly received in said counterbore, a resilient deformable gasket disposed within said socket and encircling the tube section, a frusto-conical metal locking ring formed of spring material, surrounding said tube section, disposed within said socket between the nut and the gasket, and having its small base of such diameter that it will seize and bite into the tube section when the ring is urged towards a flattened condition, said locking ring having its slant angle of the order of 60° with respect to the axis of the tube section, the large base of said locking ring bearing against the inner end face of the cylindrical section of the nut at the extreme outer periphery thereof, said large base of the locking ring having a diameter appreciably less than the diameter of said counterbore so that an annular clearance is afforded between said large base and the inner cylindrical surface of the counterbore, said inner end face of the cylindrical section of the nut being of frusto-conical configuration and having a slant angle of the order of 80° with respect to the axis of the tube section, said gasket having a cylindrical section and also a frusto-conical section which opposes and abuts flatly against said frusto-conical surface at the juncture region of the bore and counterbore of the fitting body, said gasket also having at the outer end of its cylindrical section a concave frusto-conical end face directly opposing and fitting coextensively against the convex side of the locking ring and contained entirely within the confines of said frusto-conical inner end face of the cylindrical section of the nut, all of the above defined angular sloping surfaces and faces being sloped inwards from said terminal end of the fitting body, the outer diameters of the cylindrical section of the nut, the locking ring, and the cylindrical section of the gasket being substantially equal whereby during progressive tightening of the nut to the fullest extent of which it is capable of being tightened, the large base of the locking ring will initially be engaged by the inner end face of the cylindrical section of the nut, the locking ring will be forced aaginst the gasket, the latter will be partially compressed within the socket, the small base of the locking ring will bite into the tube section to lock the latter within the fitting body, and flexure of the locking ring will further compress the peripheral regions of the gasket and will terminate short of the fully flattened condition of said locking ring.

References Cited

UNITED STATES PATENTS

| | | | |
|---|---|---|---|
| 2,405,489 | 8/1946 | Brock | 285—340 |
| 2,444,380 | 6/1948 | Shimek | 285—340 |
| 2,448,888 | 9/1948 | Hynes | 285—340 |
| 2,995,388 | 8/1961 | Morello et al. | 285—340 |
| 3,058,762 | 10/1962 | Howe | 285—340 |
| 3,312,483 | 4/1967 | Leadbetter et al. | 285—340 |
| 3,312,484 | 4/1967 | Davenport | 285—340 |

FOREIGN PATENTS 723,400  2/1955  Canada.

EDWARD C. ALLEN, *Primary Examiner.*

WAYNE L. SHEDD, *Assistant Examiner.*